United States Patent
Clutterbuck et al.

(10) Patent No.: US 6,176,578 B1
(45) Date of Patent: Jan. 23, 2001

(54) TORIC CONTACT LENSES

(75) Inventors: Timothy A. Clutterbuck, Jacksonville; Shiela B. Hickson-Curran, Ponte Verde Beach; Susan W. Neadle, Jacksonville, all of FL (US)

(73) Assignee: Johnson & Johnson Vision Care, Inc., Jacksonville, FL (US)

( * ) Notice: Under 35 U.S.C. 154(b), the term of this patent shall be extended for 0 days.

(21) Appl. No.: 09/208,516

(22) Filed: Dec. 9, 1998

(51) Int. Cl.$^7$ .................. G02C 7/04; G02C 7/02
(52) U.S. Cl. ......................... 351/160 R; 351/176
(58) Field of Search ............... 351/176, 160 R, 351/160 H, 161–162

(56) References Cited

U.S. PATENT DOCUMENTS

| 4,095,878 | 6/1978 | Fanti | 351/161 |
|---|---|---|---|
| 4,573,774 | 3/1986 | Sitterle | 351/160 H |
| 5,455,641 | * 10/1995 | Hahne et al. | 351/160 H |
| 5,532,768 | * 7/1996 | Onogi et al. | 351/160 R |
| 5,608,471 | 3/1997 | Miller | 351/161 |
| 5,861,114 | * 1/1999 | Roffman et al. | 264/2.5 |

FOREIGN PATENT DOCUMENTS

| 0 571 320 | 11/1993 | (EP). |
|---|---|---|
| 0 646825 | 4/1995 | (EP). |
| 0 741 313 | 11/1996 | (EP). |

* cited by examiner

Primary Examiner—Georgia Epps
Assistant Examiner—Jordan M. Schwartz
(74) Attorney, Agent, or Firm—Lois A. Gianneschi

(57) ABSTRACT

The invention provides toric contact lenses that exhibit good fit and good on-eye orientation regardless of whether the lens has a plus or a minus spherical power.

2 Claims, 2 Drawing Sheets

TORIC CONTACT LENSES

FIELD OF THE INVENTION

The invention relates to toric contact lenses. In particular, the invention relates to toric soft contact lenses.

BACKGROUND OF THE INVENTION

The use of contact lenses for the correction of visual acuity is well known. In particular, toric contact lenses are used for correction of the wearer's astigmatism. However, toric contact lenses are disadvantageous in that they rely on the interaction of the eyelid margin and the lens' thickness differential to orient the lens to the correct location on the wearers eye. As the thickness of the lens increases in the optical zone of the lens, the lens lifts more at the eyelid margins resulting in a decrease in the pressure on the peripheral areas that are the locations for the orienting mechanisms of the lens. Thus, the decrease in pressure results in a decrease in orientation characteristics. This problem is particularly acute with so-called plus-powered toric lenses. Therefore, a need exists for an improved toric contact lens.

DETAILED DESCRIPTION OF THE INVENTION AND PREFERRED EMBODIMENTS

It is a discovery of the invention that toric contact lenses with an improved design may be obtained by selection of certain lens parameters. The lens of the invention is advantageous in that it maintains good on-eye orientation whether the lens has a plus or a minus spherical power.

In one embodiment, the invention provides a toric contact lens comprising, consisting essentially of, and consisting of a convex outer surface, a concave inner surface, the convex surface having one or more of a slab-off gap of about 2.0 mm to about 6.00 mm, an edge thickness differential of about 0.1 to about 0.2 mm, a slab-off central diameter of about 7 to about 10 mm, and a bevel width of about 0.50 to about 2.5 mm.

In another embodiment, the invention provides a plus toric contact lens comprising, consisting essentially of, and consisting of a convex outer surface, a concave inner surface, the convex surface having one or more of a slab-off gap of about 3.50 mm to about 4.50 mm, an edge thickness differential of about 0.18 to about 0.19 mm, a slab-off central diameter of about 8.00 to about 8.50 mm, and a bevel width of about 1.40 to about 1.60 mm.

In yet another embodiment, the invention provides a minus toric contact lens comprising, consisting essentially of, and consisting of a convex outer surface, a concave inner surface, the convex surface having one or more of a slab-off gap of about 3.50 mm to about 4.50 mm, an edge thickness differential of about 0.16 to about 0.175 mm, a slab-off central diameter of about 9.00 to about 9.50 mm, and a bevel width of about 0.85 to about 1.15 mm.

By "plus toric lens" is meant a contact lens with a toric, or cylinder correction, and a positive spherical power. By "minus toric lens" is meant a contact lens with cylinder correction and a negative spherical power. By "slab-off" is meant the tapered area of the lens peripheral to the central optic zone. By "slab-off gap" is meant the vertical distance between the edges of the slab-offs at their closest points to each other. By edge thickness differential" is meant the difference between the thickest portion of the lens periphery in a non-slab-off area and the thinnest part of the periphery within the slab-off area. By "slab-off central diameter" is meant the vertical distance between the center points of the innermost edges of the slab-offs. By "bevel" is meant an inclined area at the periphery of the lens.

Contact lenses useful in the invention may be either hard or, preferably, soft lenses having cylinder correction, which lenses are made of any suitable material. The lenses of the invention may have any of a variety of corrective optical characteristics incorporated onto the surfaces in addition to the toric correction. For example, the lens may have any one or more of spheric, aspheric, bifocal, multifocal, or prismatic corrections. These corrections may be on either or both the convex or concave surface.

Figure 1:
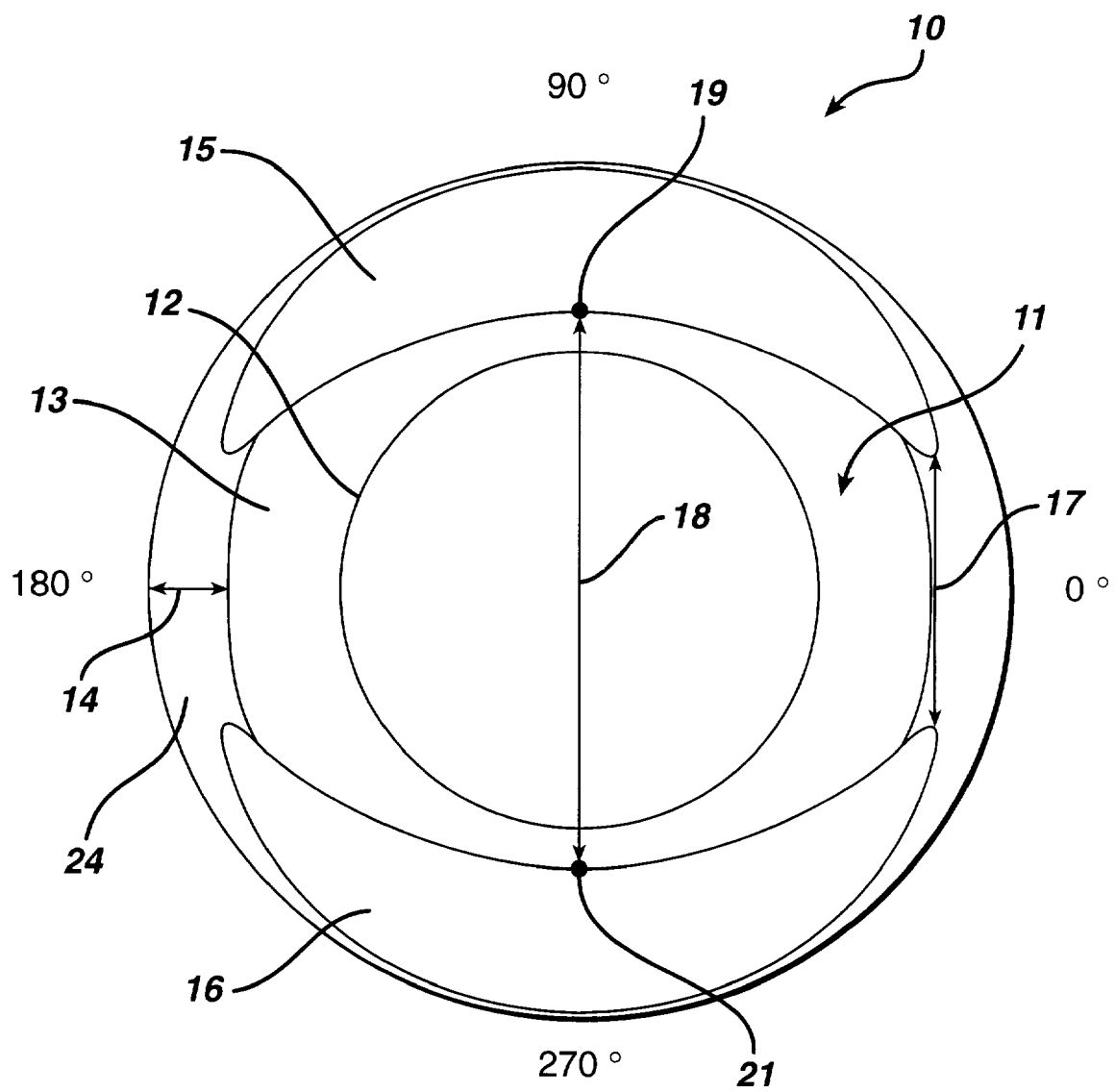
FIG. 1 is a plan view of a contact lens of the invention.

Referring now to FIG. 1, toric contact lens 10 of the invention is shown. Lens 10 has convex surface 11 and a concave surface, not shown, that sits on the wearer's cornea. Convex surface 11 has central optical zone 12. Central optical zone 12 may be of any desired geometry that corresponds to the wearer's prescription including, without limitation, spherical, spherical multifocal, aspherical, and the like. A non-optical lenticular zone 13 surrounds the central optical zone 12. The optical zone of the concave surface is a toric, or cylindrical, surface centered about a toric axis that corrects for the wearer's astigmatism.

Slab-off areas 15 and 16 are shown at the periphery of lens 10. The slab-off gap 17 between the slab-off areas being 4.50 mm peripheral bevel zone 24 is also shown. The bevel width 14 of lens 10 is 1.00 mm. The slab-off central diameter 18 between center points 19 and 21 of slab-offs 15 and 16, respectively, is 9.25 mm.

Figure 2:
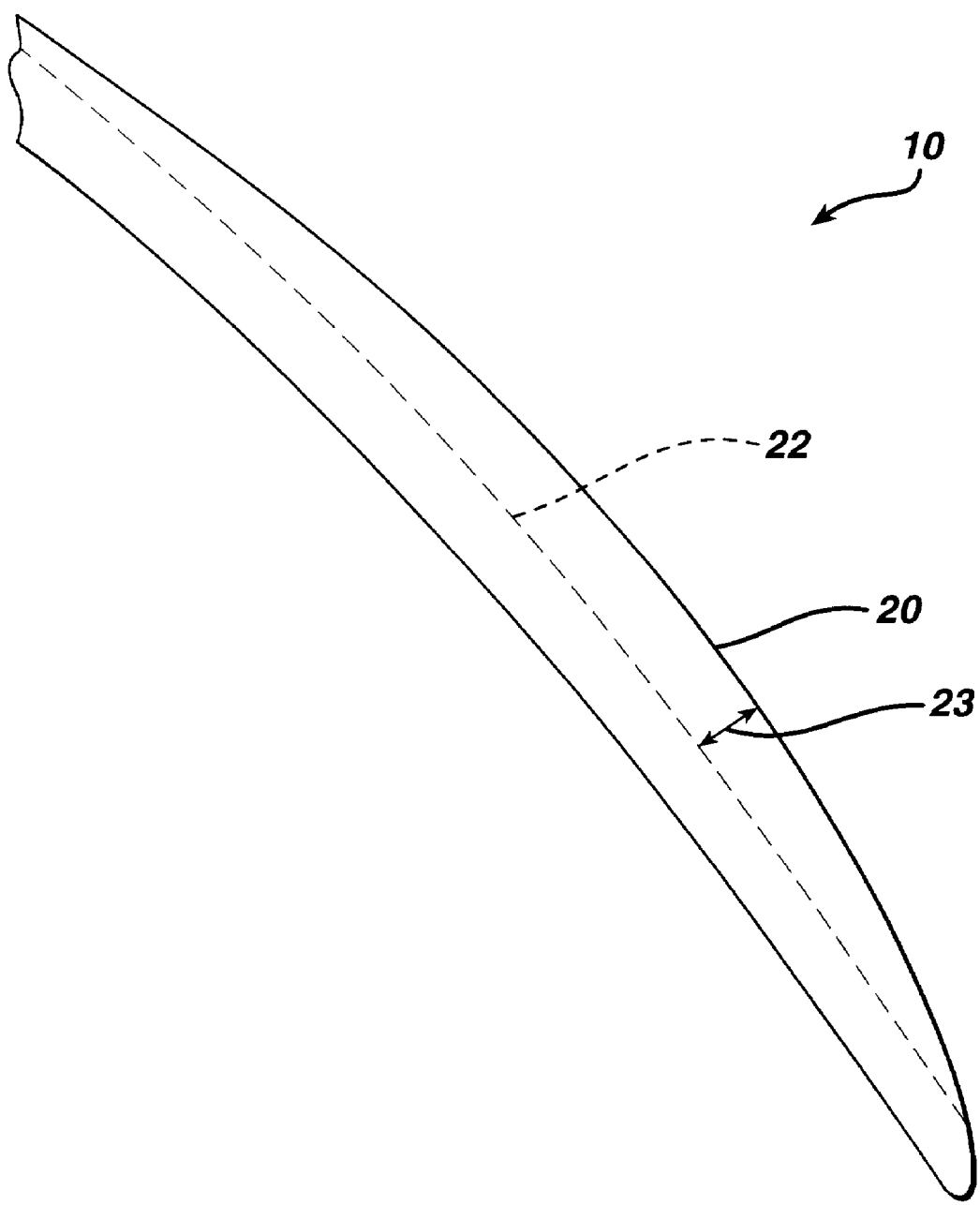
FIG. 2 is a magnified, cross-sectional view of a portion of the lens edge of lens of FIG. 1 at the 180° axis.

FIG. 2 is a magnified, cross-sectional view of a portion of an edge of lens 10. Solid line 20 is the lens edge at 180°. The dashed line 22 is an overlay of the edge at 90°. FIG. 2 illustrates the difference in thickness 23 between the horizontal and vertical meridians of the lens. The thickness differential orients the lens and may be varied by modifying lens geometry to optimize lens rotation, movement, and stabilization characteristics.

The lenses of the invention may be produced by any conventional method for producing contact lenses. For example, the lens design may be cut into a metal and the metal used to produce plastic mold inserts for the concave and convex surfaces of the lens. A suitable liquid resin is placed between the inserts, the inserts compressed, and the resin cured. Alternatively, the lens of the invention may be produced by cutting the lens on a lathe.

What is claimed is:

1. A contact lens having a toric correction and a positive spherical correction comprising a convex outer surface, a concave inner surface, the convex surface comprising slab-offs and slab-off gaps of about 3.50 mm to about 4.50 mm, an edge thickness differential of about 0.18 to about 0.19 mm, a slab-off central diameter of about 8.00 to about 8.50 mm, and a bevel width of about 1.40 to about 1.60 mm .

2. A contact lens having a toric correction and a minus spherical correction comprising a convex outer surface, a concave inner surface, the convex surface comprising slab-offs and slab-off gaps of about 3.50 mm to about 4.50 mm, an edge thickness differential of about 0.16 to about 0.175 mm, a slab-off central diameter of about 9.00 to about 9.50 mm, and a bevel width of about 0.85 to about 1.15 mm.

* * * * *